US 11,717,972 B2

(12) United States Patent
Holmes et al.

(10) Patent No.: US 11,717,972 B2
(45) Date of Patent: *Aug. 8, 2023

(54) WORKBENCH SYSTEM

(71) Applicant: BAE Systems plc, London (GB)

(72) Inventors: David Samuel John Holmes, Balderstone (GB); Martin Knott, Balderstone (GB); Daniel James Middleton, Balderstone (GB)

(73) Assignee: BAE Systems plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,385

(22) Filed: Jul. 28, 2021

(65) Prior Publication Data

US 2021/0354303 A1    Nov. 18, 2021

Related U.S. Application Data

(63) Continuation of application No. 17/058,298, filed as application No. PCT/GB2019/051694 on Jun. 18, 2019, now Pat. No. 11,110,610.

(30) Foreign Application Priority Data

Jun. 19, 2018  (EP) .................................... 18178480
Jun. 19, 2018  (GB) .................................... 1810011

(51) Int. Cl.
*B25J 9/16*        (2006.01)
*B25J 19/06*       (2006.01)
*G05B 19/418*      (2006.01)

(52) U.S. Cl.
CPC ............ *B25J 9/1697* (2013.01); *B25J 9/1676* (2013.01); *B25J 9/1687* (2013.01); *B25J 19/06* (2013.01);

(Continued)

(58) Field of Classification Search
CPC ........ B25J 9/1697; B25J 9/1676; B25J 19/06; B25J 9/1687; B25J 9/1674;

(Continued)

(56) References Cited

U.S. PATENT DOCUMENTS 6,167,607 B1    1/2001  Pryor
9,486,921 B1   11/2016  Straszheim et al.

(Continued)

FOREIGN PATENT DOCUMENTS

CN    106091922 A    11/2016
CN    106514667 A     3/2017

(Continued)

OTHER PUBLICATIONS

Extended European Search Report for European Patent Appl. No. 21214706.0 dated Feb. 7, 2022, 12 pages.

(Continued)

*Primary Examiner* — Robert T Nguyen
(74) *Attorney, Agent, or Firm* — Maine Cernota & Rardin (57) ABSTRACT

A workbench system comprising: a workbench; a multi-axis robot; a visible light projector; and a controller; wherein the workbench and the robot are located in a common workspace; the controller is configured to: determine a movement operation for the robot; and, using the determined movement operation, control the visible light projector to project a visible light indication onto at least one of a surface of the workbench and a surface of the workspace; the visible light indication indicates a limited area of the workbench and/or workspace, the limited area corresponding to a limited volume of space; and the movement operation is such that, if the robot performs the movement operation, the robot moves entirely within only the limited volume of space.

13 Claims, 3 Drawing Sheets

(52) U.S. Cl.
CPC .. *G05B 19/418* (2013.01); *G05B 2219/40202* (2013.01)

(58) Field of Classification Search
CPC ........ G05B 2219/40202; G05B 19/418; G05B 2219/40203; G05B 2219/40196; G05B 19/4061
See application file for complete search history.

(56) References Cited

U.S. PATENT DOCUMENTS

| | | | |
|---|---|---|---|
| 9,764,484 | B2 | 9/2017 | Katayama |
| 9,889,563 | B1 | 2/2018 | Stubbs |
| 9,939,784 | B1 | 4/2018 | Berardinelli |
| 10,081,107 | B2 | 9/2018 | Sakabe |
| 10,580,211 | B2* | 3/2020 | Grossman ............. G06T 19/006 |
| 10,967,506 | B2 | 4/2021 | Bradski et al. |
| 10,967,508 | B2 | 4/2021 | Nelson |
| 2005/0207618 | A1* | 9/2005 | Wohler .................. B25J 9/1697 382/103 |
| 2010/0045464 | A1 | 2/2010 | Knopf |
| 2010/0194583 | A1* | 8/2010 | Kawabata ............. G01S 7/4817 340/3.6 |
| 2010/0265039 | A1 | 10/2010 | Clements |
| 2011/0184555 | A1 | 7/2011 | Kosuge et al. |
| 2012/0182155 | A1 | 7/2012 | Sato et al. |
| 2012/0265345 | A1 | 10/2012 | Nakahara |
| 2012/0290132 | A1* | 11/2012 | Kokubo .................. B25J 9/1666 700/250 |
| 2013/0201292 | A1 | 8/2013 | Walter et al. |
| 2013/0345874 | A1 | 12/2013 | Blumberg et al. |
| 2014/0003674 | A1 | 1/2014 | Coley |
| 2014/0207285 | A1* | 7/2014 | Sakabe .................. B25J 9/1697 700/259 |
| 2014/0277724 | A1 | 9/2014 | Suyama et al. |
| 2014/0277733 | A1* | 9/2014 | Kouno ................... B25J 9/1697 315/153 |
| 2015/0120055 | A1 | 4/2015 | Miyazawa et al. |
| 2015/0294496 | A1 | 10/2015 | Medasani |
| 2015/0310599 | A1 | 10/2015 | Yamamoto |
| 2015/0352719 | A1 | 12/2015 | Nakazato et al. |
| 2016/0214259 | A1 | 7/2016 | Yamamooto et al. |
| 2016/0368148 | A1 | 12/2016 | Payton et al. |
| 2017/0001315 | A1* | 1/2017 | Katayama ................ B25J 19/06 |
| 2017/0001316 | A1 | 1/2017 | Katayama |
| 2017/0001317 | A1* | 1/2017 | Katayama ................ B25J 19/06 |
| 2017/0028553 | A1 | 2/2017 | Tsuda et al. |
| 2017/0050308 | A1 | 2/2017 | Charlton et al. |
| 2017/0248936 | A1 | 8/2017 | Hoshino |
| 2017/0249488 | A1 | 8/2017 | Telling |
| 2017/0305019 | A1 | 10/2017 | Pomrehn et al. |
| 2018/0071914 | A1 | 3/2018 | Heidemann et al. |
| 2018/0099408 | A1 | 4/2018 | Shibata |
| 2019/0105779 | A1* | 4/2019 | Einav ..................... B25J 9/1689 |
| 2019/0375109 | A1 | 12/2019 | High |
| 2020/0394747 | A1 | 12/2020 | Chatterjee et al. |
| 2021/0089040 | A1 | 3/2021 | Ebrahimi Afrouzi et al. |
| 2021/0146546 | A1* | 5/2021 | Linkowski ............. B25J 9/1676 |

FOREIGN PATENT DOCUMENTS

| | | | |
|---|---|---|---|
| CN | 108053005 | A | 5/2018 |
| EP | 1862270 | A2 | 12/2007 |
| EP | 1911553 | A1 | 4/2008 |
| EP | 2783815 | A2 | 10/2014 |
| EP | 3082326 | A1 | 10/2016 |
| EP | 3159120 | A1 | 4/2017 |
| EP | 3238882 | A1 | 11/2017 |
| GB | 2559020 | A | 7/2018 |
| JP | H10202451 | A | 8/1998 |
| JP | 2001209694 | A | 8/2001 |
| JP | 2005301986 | A | 10/2005 |
| JP | 2011076229 | A | 4/2011 |
| JP | 2012223869 | A1 | 11/2012 |
| JP | 2013089122 | A | 5/2013 |
| JP | 2014142814 | A | 8/2014 |
| JP | 2017045202 | A | 3/2017 |
| JP | 2018156613 | A | 10/2018 |
| WO | 2005085904 | A2 | 9/2005 |
| WO | 2012109593 | A1 | 8/2012 |
| WO | 2014047491 | A1 | 3/2014 |
| WO | 2014152254 | A2 | 9/2014 |
| WO | 2015194658 | A1 | 12/2015 |
| WO | 2017163251 | A2 | 9/2017 |
| WO | 2018031861 | A1 | 2/2018 |

OTHER PUBLICATIONS

Extended European Search Report for European Patent Appl. No. 21214719.3 dated Feb. 15, 2022, 8 pages.
Extended European Search Report for European Appl. No. 21214704 dated Apr. 21, 2022, 7 pages.
International Search Report and Written Opinion of International Application No. PCT/GB2019/051694, dated Aug. 28, 2019, 14 pages.
Search Report under Section 17(5) of Great Britain Application No. GB1810011 5, dated Dec. 6, 2018, 5 pages.
Extended European Search Report of European Application No. EP18178480.2, dated Dec. 18, 2018, 9 pages.
Combined Search and Examination Report under Sections 17 and 18(3) of Great Britain Application No. GB1908692.5, dated Dec. 4, 2019, 8 pages.
International Search Report and Written Opinion of International Application No. PCT/GB2019/051693, dated Oct. 21, 2019, 24 pages.
Search Report under Section 17(5) of Great Britain Application No. GB1810009.9, dated Dec. 4, 2018, 4 pages.
Partial European Search Report of European Application No. EP18178776.0, dated Dec. 20, 2018, 12 pages.
Combined Search and Examination Report under Sections 17 and 18(3) of Great Britain Application No. GB1908693.3, dated Dec. 12, 2019, 7 pages.
International Search Report and Written Opinion of International Application No. PCT/GB2019/051692, dated Oct. 9, 2019, 12 pages.
Search Report under Section 17(5) of Great Britain Application No. GB1810012.3, dated Dec. 11, 2018, 4 pages.
Partial European Search Report of European Application No. EP18275084.4, dated Dec. 19, 2018, 13 pages.
Combined Search and Examination Report under Section 17 and 18(3) of Great Britain Application No. GB1908694.1, dated Dec. 5, 2019, 8 pages.
International Search Report and Written Opinion of Internatioanl Application No. PCT/GB2019/051695, dated Sep. 2, 2019, 14 pages.
Search Report under Section 17(5) of Great Britain Application No. GB1810008.1, dated Nov. 30, 2018, 4 pages.
Extended European Search Report of European Application No. EP18178474.5, dated Dec. 13, 2018, 9 pages.
Combined Search and Examination Report under Sections 17 and 8(3) of Great Britain Application No. GB1908691.7, dated Dec. 11, 2019, 8 pages.
International Preliminary Report on Patentability of International Application No. PCT/GB2019/051694, dated Dec. 22, 2020, 8 Pages.
International Preliminary Report on Patentability of International Application No. PCT/GB2019/051693, dated Dec. 22, 2020, 17 Pages.
International Preliminary Report on Patentability of International Application No. PCT/GB2019/051692, dated Dec. 22, 2020, 8 Pages.
Office Action for U.S. Appl. No. 17/058,298, dated Apr. 13, 2021, 26 Pages.
Notice of Allowance for U.S. Appl. No. 17/058,298, dated May 10, 2021, 6 Pages.
Final Office Action for U.S. Appl. No. 17/058,878 dated Mar. 3, 2023, 75 pages.

(56) References Cited

OTHER PUBLICATIONS

Office Action Advisory for U.S. Appl. No. 17/058,878 dated Apr. 12, 2023, 4 pages.
Office Action for U.S. Appl. No. 17/058,878 dated Dec. 30, 2022, 63 pages.

* cited by examiner

WORKBENCH SYSTEM

RELATED APPLICATIONS

This application is a continuation of U.S. application Ser. No. 17/058,298, filed on Nov. 24, 2020, which is a national phase application filed under 35 USC § 371 of PCT Application No. PCT/GB2019/051694 with an International filing date of Jun. 18, 2019, which claims priority of GB Patent Application 1810011.5 filed Jun. 19, 2018 and EP Patent Application 18178480.2 filed Jun. 19, 2018. Each of these applications is herein incorporated by reference in its entirety for all purposes.

FIELD OF THE INVENTION

The present invention relates to workbenches, including but not limited to assisted workbenches comprising collaborative robot systems for robot and human collaboration.

BACKGROUND

Work tables or workbenches are often employed by human users for working on, repairing, assembling, or disassembling many different articles.

Assisted workbenches range from relatively simple systems, in which work benches may be fitted with component manipulators which may be computer numerically controlled, to relatively more complex, intelligent systems that may include more advanced technologies.

In recent years, the use of collaborative robots that share workspaces with humans has increased. Collaborative robots are designed to work with or near humans to enable humans and robots to collaborate so as to complete tasks. Such tasks include, but are not limited to, vehicle (e.g. aircraft) manufacturing and assembly tasks. Humans may work within or near the working space of the robot.

SUMMARY OF THE INVENTION

In a first aspect, the present invention provides a workbench system comprising: a workbench; a multi-axis robot comprising an end effector for holding an object; a visible light projector; a camera; and a controller. The workbench and the robot are located in a common workspace. The controller is configured to: determine a movement operation for the robot; and, using the determined movement operation, control the visible light projector to project a visible light indication onto at least one of a surface of the workbench and a surface of the workspace. The visible light indication indicates a limited area of the workbench and/or workspace, the limited area corresponding to a limited volume of space. The movement operation is such that, if the robot performs the movement operation, the robot moves entirely within only the limited volume of space. The controller is further configured to: control the robot such that the robot presents multiple different views of the object held by the end effector to the camera; control the camera to capture images of multiple different views of the object held by the end effector; and perform a validation process using the images captured by the camera. The visible light projector may be configured to project a visible light indication onto the object held by the end-effector.

The limited volume of space may be entirely above the limited area of the workbench and/or workspace.

The workbench system may further comprise: one or more sensors configured to detect a presence of a user within the limited volume of space; wherein the controller is configured to control the robot to perform the movement operation responsive to determining, using measurements of the one or more sensors, that the user is not within the space.

The controller may be further configured to control the visible light projector to project a visible light indicator on to the object held by the end effector.

The controller may be further configured to determine a task to be performed by a user using the workbench system, and control the robot based on the determined task. The controller may be further configured to control the visible light projector to project the visible light indicator onto the object, the visible light indicator based on the determined task. The controller may be further configured to control the visible light projector to project a further visible light indicator onto a surface of the workbench, the further visible light indicator based on the determined task. The workbench system may further comprise a sensor system comprising one or more sensors, the sensor system configured to identify a user in the workspace. The controller may be further configured to determine the task based on the identity of the user. The one or more sensors may be configured to acquire a user identifier for identifying the user from a mobile device carried by the user, wherein the mobile device is a mobile device selected from the group of mobile devices consisting of a body-worn mobile device, and a radio-frequency identification tag. The workbench system may further comprising a display. The controller may be further configured to control the display based on the determined task.

The camera may be a visible light detecting camera

The workbench system may comprise a container, the container comprising a plurality of compartments. The controller may be further configured to control the visible light projector to project a visible light indicator onto the container, thereby to indicate a specific one of the plurality of compartments.

The visible light projector may comprise a laser projector.

In a further aspect, the present invention provides a method for a workbench system, the workbench system comprising a workbench, a multi-axis robot comprising an end effector for holding an object, a visible light projector, a camera, and a controller, the workbench and the robot being located in a common workspace. The method comprises: determining, by the controller, a movement operation for the robot, the movement operation being such that the robot presents multiple different views of the object held by the end effector to the camera; using the determined movement operation, controlling the visible light projector to project a visible light indication onto at least one of a surface of the workbench and a surface of the workspace; controlling, by the controller, the robot to perform the movement operation; controlling, by the controller, the camera to capture images of the multiple different views of the object held by the end effector; and performing, by the controller, a validation process using the images captured by the camera. The visible light indication indicates a limited area of the workbench and/or workspace, the limited area corresponding to a limited volume of space. The movement operation is such that, if the robot performs the movement operation, the robot moves entirely within only the limited volume of space.

The method may further comprise determining, by the controller, whether a user is within the limited volume of space. The controlling of the robot to perform the movement operation may be performed responsive to determining that the user is not within the space.

In a further aspect, the present invention provides a workbench system comprising a workbench, a multi-axis robot, a visible light projector, and a controller. The workbench and the robot are located in a common workspace. The controller is configured to determine a movement operation for the robot, and, using the determined movement operation, control the visible light projector to project a visible light indication onto at least one of a surface of the workbench and a surface of the workspace. The visible light indication indicates a limited area of the workbench and/or workspace, the limited area corresponding to a limited volume of space. The movement operation is such that, if the robot were to perform the movement operation (e.g. under control of the controller), the robot would move entirely within only the limited volume of space.

The limited volume of space may be entirely above the limited area of the workbench and/or workspace.

The workbench system may further comprise one or more sensors configured to detect a presence of a user within the limited volume of space. The controller may be configured to control the robot to perform the movement operation responsive to determining, using measurements of the one or more sensors, that the user is not within the space.

The robot may comprise an end effector for holding an object. The controller may be further configured to control the visible light projector to project a visible light indicator on to the object held by the end effector.

The controller may be further configured to determine a task to be performed by a user using the workbench system and control the robot based on the determined task.

The controller may be further configured to control the visible light projector to project the visible light indicator onto the object, the visible light indicator based on the determined task. The controller may be further configured to control the visible light projector to project a further visible light indicator onto a surface of the workbench, the further visible light indicator based on the determined task.

The workbench system may further comprise a sensor system comprising one or more sensors, the sensor system configured to identify a user in the workspace. The controller may be further configured to determine the task based on the identity of the user. The one or more sensors may be configured to acquire a user identifier for identifying the user from a mobile device carried by the user, wherein the mobile device is a mobile device selected from the group of mobile devices consisting of a body-worn mobile device, and a radio-frequency identification tag.

The workbench system may further comprise a display. The controller may be further configured to control the display based on the determined task.

The workbench system may further comprise a camera. The robot may comprise an end effector for holding an object. The controller may be further configured to control the robot such that the robot presents multiple different views of the object held by the end effector to the camera, control the camera to capture images of multiple different views of the object held by the end effector, and perform a validation process using the images captured by the camera.

The workbench system may comprise a container having a plurality of compartments. The controller may be further configured to control the visible light projector to project a visible light indicator onto the container, thereby to indicate a specific one of the plurality of compartments.

The visible light projector may comprise a laser projector or a lamp-based projector.

In a further aspect, the present invention provides a workbench system comprising a workbench, a multi-axis robot, a visible light projector, and a controller. The workbench and the robot are located in a common workspace. The controller may be configured to control the robot to move the robot relative to the workbench, through a space, and control the visible light projector to project a visible light indication of the space onto at least one of a surface of the workbench and a surface of the workspace. The controller may be configured to control the robot to move the robot along a path, and control the visible light projector to project a visible light indication of the path onto at least one of a surface of the workbench and a surface of the workspace.

In a further aspect, the present invention provides a method for a workbench system. The workbench system comprises a workbench, a multi-axis robot, a visible light projector, and a controller, the workbench and the robot being located in a common workspace. The method comprises: determining, by the controller, a movement operation for the robot, and, using the determined movement operation, controlling the visible light projector to project a visible light indication onto at least one of a surface of the workbench and a surface of the workspace. The visible light indication indicates a limited area of the workbench and/or workspace, the limited area corresponding to a limited volume of space. The movement operation is such that, if the robot performs the movement operation, the robot moves entirely within only the limited volume of space.

DETAILED DESCRIPTION

Figure 1:
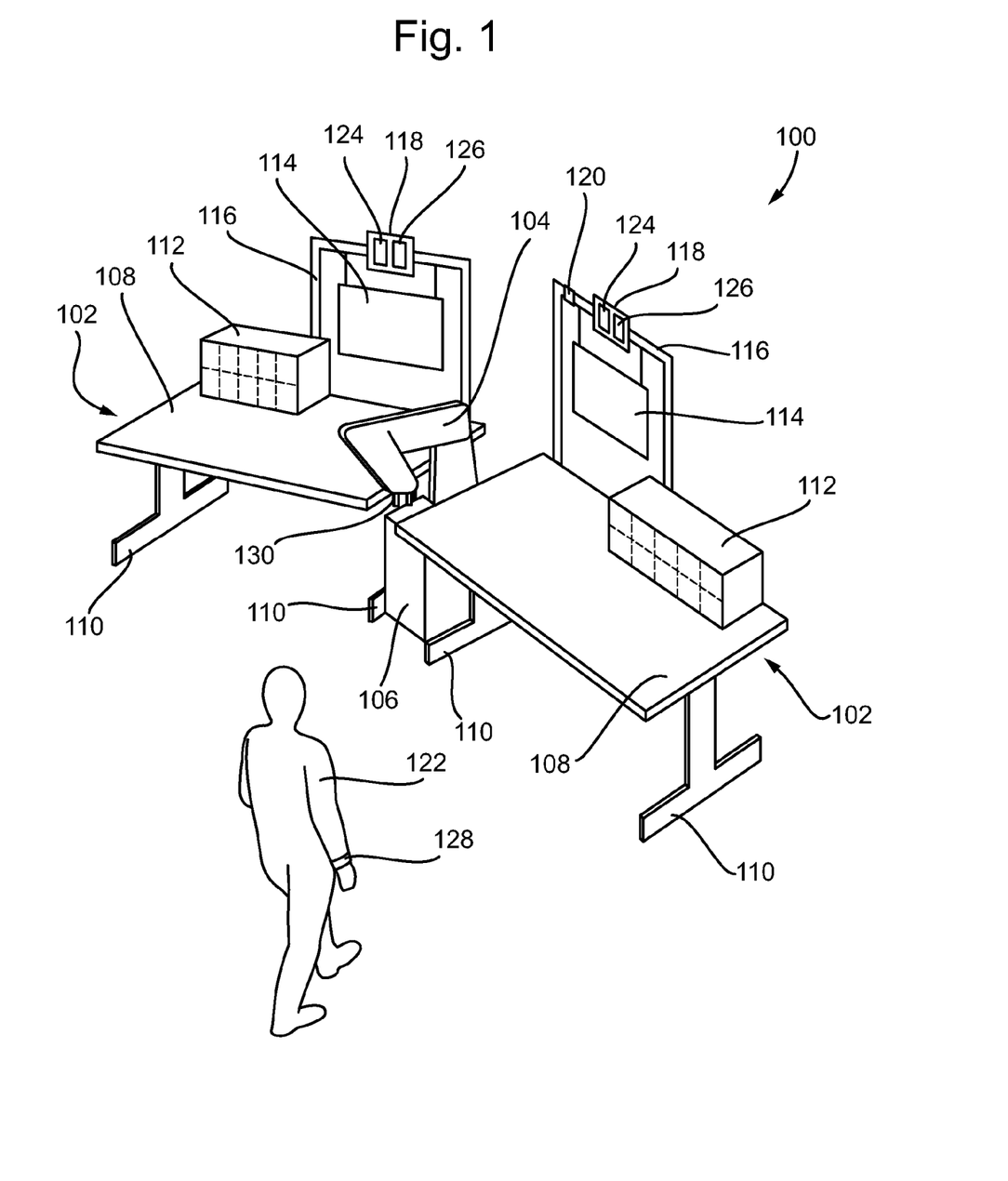
FIG. 1 is a schematic illustration (not to scale) showing a perspective view of an assisted workbench system.

FIG. 1 is a schematic illustration (not to scale) showing a perspective view of an assisted workbench system 100.

Figure 2:
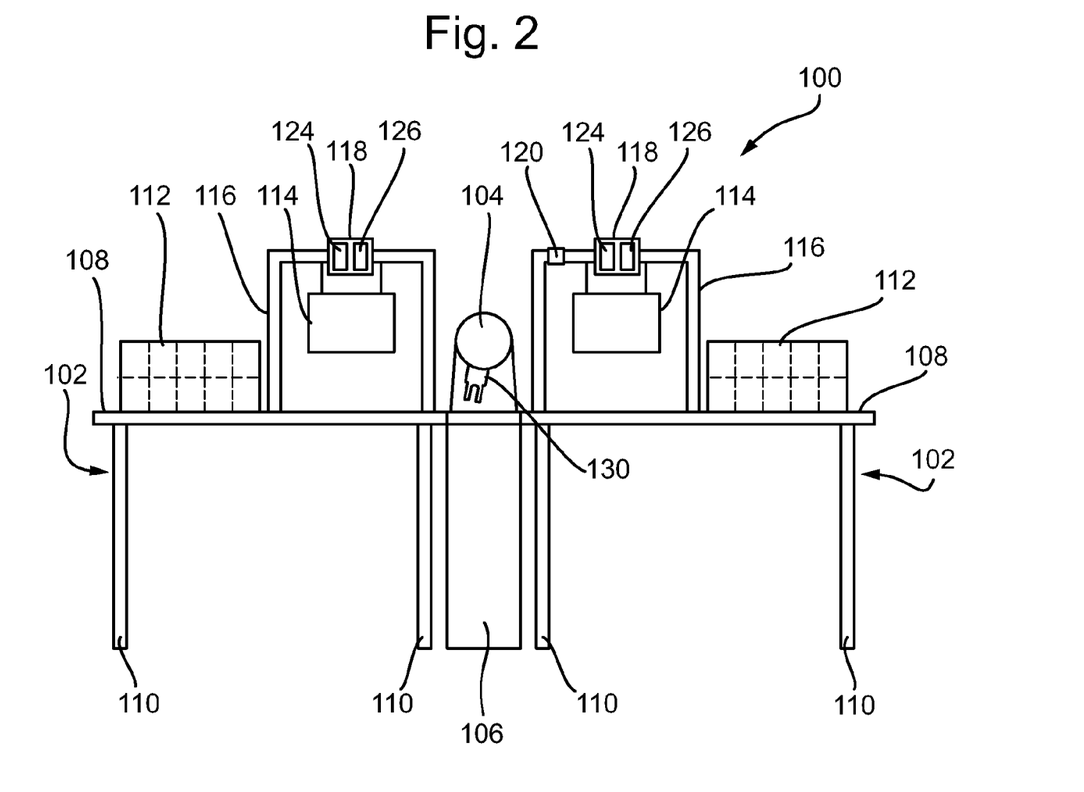
FIG. 2 is a schematic illustration (not to scale) showing a front view of the assisted workbench system.

FIG. 2 is a schematic illustration (not to scale) showing a front view of the assisted workbench system 100.

In this embodiment, the system 100 comprises two workbenches 102 positioned substantially side-by-side, a robot 104 located between the two workbenches 102, and a controller 106. The workbenches 102 may be considered to be workbenches or tables at which mechanical or practical work is performed by the user.

In this embodiment, each workbench 102 comprises a benchtop 108 having an upper surface and a lower surface, one or more leg assemblies 110 attached to the lower surface of the benchtop 108, a component container 112 coupled to the upper surface of the benchtop 108, a display 114 coupled to the upper surface of the benchtop 108 and held above the benchtop 108 via a frame 116, and an optical system 118 mounted to the frame 116. One or both of the workbenches 102 comprises one or more sensors 120.

The benchtops 108 provide substantially flat surfaces upon which a user 122 performs work on an article, e.g. performs repair, assembly, disassembly, and/or maintenance operations, and the like.

The leg assemblies 110 are configured to elevate the benchtops 108 above a floor or ground surface. The leg assemblies 110 are adjustable (e.g. height adjustable) such that the height of the benchtops 108 above the ground surface can be varied. The controller 106 is configured to control the leg assemblies 110.

The component containers 112 each comprise a respective plurality of compartments. In this embodiment, each compartment comprises a plurality of a respective type of component or consumable for use by the user 122 when performing a task, e.g. working on an article. Preferably, each compartment comprises of a given component container 112 contains a different type of component. Preferably, the component containers 112 are arranged substantially identically, i.e. such that corresponding compartments of the two component containers 112 contain the same type of components. Examples of components and consumables that may be included in the component containers 112 include, but are not limited to, fasteners, clips, gaskets, grommets, pipes, electrical looms, rivets, ducts, brackets, anchor nuts, clamps and adhesives.

In this embodiment, each compartment comprises a respective indicator, for example a light emitter such as a light emitting diode (LED). As described in more detail later below with reference to FIG. 3, these indicators are configured to be activated so as to indicate to the user 122 from which compartment a component should be selected for a current operation. The controller 106 is configured to control the indicators.

In this embodiment, the displays 114 are touchscreen displays on which information may be presented to the user 122 and using which the user 122 may input information. The displays 114 are operatively coupled to the controller 106 e.g. via a wired or wireless link, such that the controller 106 may control the information displayed on the displays 114 and such that user inputs received by the displays are sent to the controller 106.

The frames 116 are configured to elevate the displays 114 above the upper surfaces of the benchtops 108. In some embodiments, the frames 116 are adjustable (e.g. height adjustable) such that the height of the displays 114 above the benchtops 108 can be varied. The controller 106 may be configured to control the frames 116.

Each optical system 118 is coupled to a respective frame 116 and, as such, its height above the benchtop 108 may be adjusted by controlling that frame 116. Each optical system 118 comprises an optical projector 124 and a camera 126. The optical projectors 124 are projectors configured to project visible light, e.g. laser light projectors or lamp-based projectors, onto other components of the system 100 (e.g. onto the benchtops 108 and/or objects thereon, such as articles being worked on by the user 122) and the surrounding area (e.g. onto the floor, walls, and/or ceiling of the workspace in which the system 100 is operating). Laser projectors tend to be highly accurate, and tend to be capable of providing indications to the user 122 with a high degree of accuracy. Lamp-based projectors tend to enable a large amount of information or graphical imaging to be presented. The controller 106 is configured to control the optical projectors 124. The cameras 126 are visible light detecting cameras configured to capture images of other components of the system 100 (e.g. of the benchtops 108 and/or objects thereon, such as articles being worked on by the user 122), and entities within the workspace in which the system 100 is operating, such as the user 122. The controller 106 is configured to control the cameras 126. The controller 106 is coupled e.g. via a wired or wireless link, to the cameras 126 such that images captured by the cameras 126 may be sent to the controller 106 and interrogated to validate the image against a known good standard.

The sensors 120 include one or more sensors configured to detect the presence of the user 122 within the workspace, i.e. proximate to the workbench system 100. The sensors 120 are configured to identify the user 122. In particular, in this embodiment, the user 122 wears a smartwatch 128 on his or her wrist. The smartwatch 128 may be a conventional smartwatch. The smartwatch 128 is a mobile device comprising a touchscreen display. The smartwatch 128 stores data that may be used to identify the user 122. The sensors 120 include one or more sensors configured to acquire information identifying the user 122 from the smartwatch 128. For example, in some embodiments, the smartwatch 128 transmits a signal to the one or more sensors 120 that includes an identifier for the user 122. In some embodiments, the one or more sensors 120 interrogate the smartwatch 128 and retrieve an identifier for the user 122.

In some embodiments, the user 122 may carry a radio-frequency identification (RFID) tag which electronically-stores information related to the user 22 (e.g. a user identifier, which may uniquely identify the user), and the sensors 120 include an RFID reader configured to interrogate the RFID tag.

The controller 106 is configured to control the sensors 120. The controller 106 is coupled e.g. via a wired or wireless link, to the sensors 120 such that information acquired by the sensors 120 (i.e. sensor measurements) may be sent to the controller 106.

In this embodiment, the robot 104 (which may also be referred to as a robot arm) is a six-axis articulated robot. The robot 104 comprises an end effector 130. The end effector 130 comprises a gripper.

The robot 104 and the human user 122 share a common workspace. Both the robot 104 and the human 122 may move within the common workspace. The robot 104 is a collaborative robot, or "cobot".

In this embodiment, the controller 106 comprises one or more processors configured to process received information (such as camera images, sensor measurements, and user inputs), and to control the various elements of the workbench system 100. As described in more detail later below with reference to FIG. 3, the controller 106 may receive information from the workbenches 102, the robot 104, the user 122, and/or the smartwatch 128. As described in more detail later below with reference to FIG. 3, the controller 106 may send information (such as a control signal for controlling) to the workbenches 102, the robot 104, and/or the smartwatch 128.

The controller 106 may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM etc., or any combination of these or other storage media.

Figure 3:
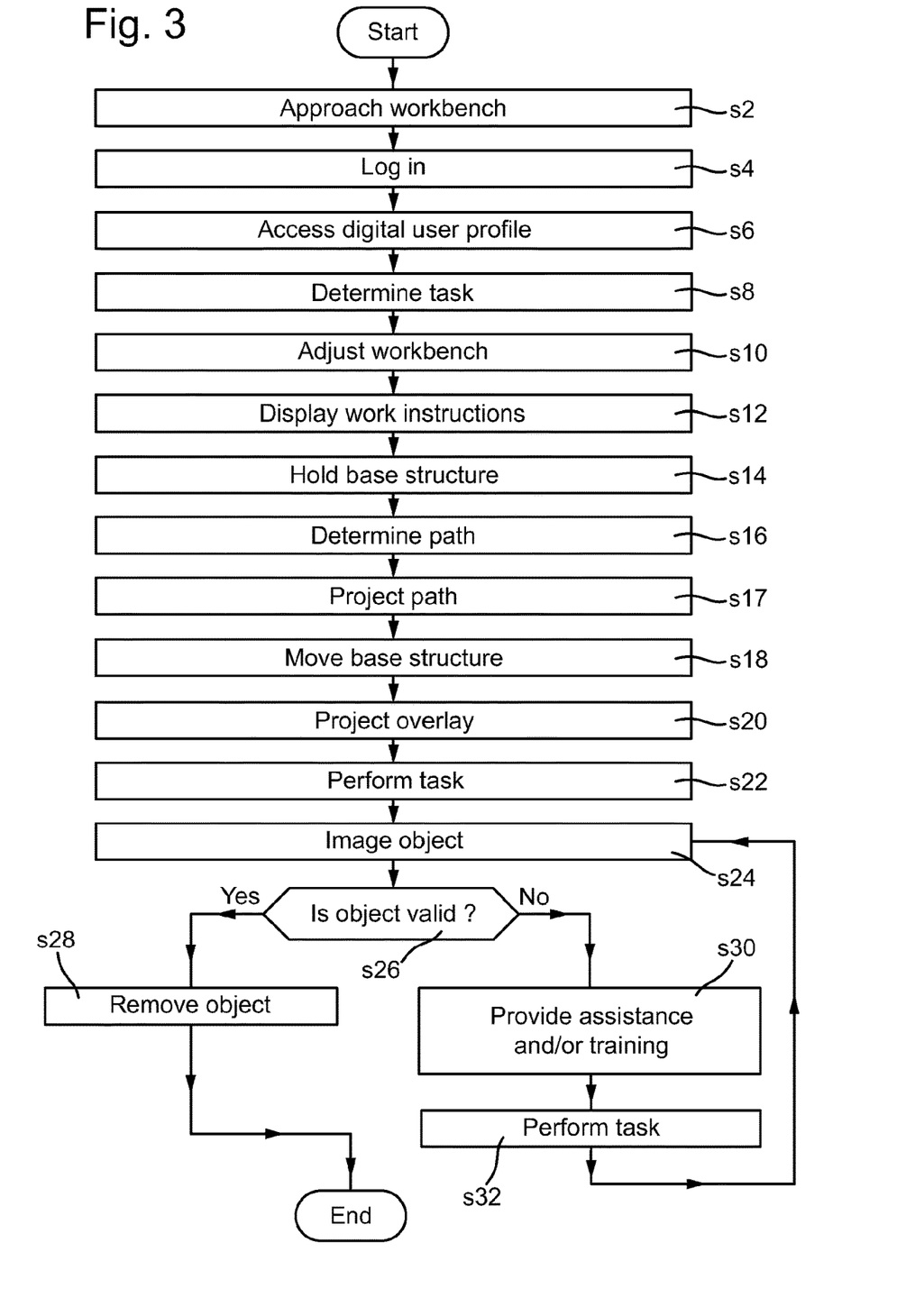
FIG. 3 is a process flow chart showing certain steps of a method of performing a task using the workbench system.

FIG. 3 is a process flow chart showing certain steps of a method of the user 122 performing a task assisted by the workbench system 100.

It should be noted that certain of the process steps depicted in the flowchart of FIG. 3 and described below may be omitted or such process steps may be performed in differing order to that presented above and shown in FIG. 3. Furthermore, although all the process steps have, for convenience and ease of understanding, been depicted as discrete temporally-sequential steps, nevertheless some of the process steps may in fact be performed simultaneously or at least overlapping to some extent temporally.

At step s2, the user 122 approaches the workbench system 100. The user 122 enters the workspace in which the workbench system 100 is located and in which the user 122 is to work.

At step s4, the user 122 logs in to the workspace system 100. In this embodiment, a user identifier stored on the user's smartwatch 128 is acquired by the one or more sensors 120, and is transferred from the one or more sensors 120 to the controller 106.

In other embodiments, the user 122 may log in to the system 100 in a different way. For example, in some embodiments, the user may enter a user input (e.g. a username and password) into the system 100 using one of the touchscreen displays 114. In some embodiments, the one or more sensors 120 acquire the user identifier stored by an RFID tag worn by the user 122, and transfer that user identifier to the controller 106. In some embodiments, the user 122 is identified by the controller 106 performing a face recognition process using images of the user 122 taken by a camera 126. In some embodiments, the user 122 is identified by the controller 106 performing a voice recognition process using a recording of the user's voice taken by an audio system of the system 100.

Thus, the user 122 is identified by the controller 106.

At step s6, using the user identifier, the controller 106 accesses a digital user profile of the user 122. The digital user profile of the user 122 may be stored locally on a memory of the controller 106, or may be stored remotely from the controller 106 and accessed via a network, e.g. the Internet, or a Local Area Network (LAN).

In this embodiment, the user profile comprises a so-called "digital training passport" of the user 122. The digital training passport of the user 122 stores skills and competencies information for the user 122. More specifically, in this embodiment, the digital training passport stores a list of the skills that have been acquired by the user 122, a list of the user's competencies, and a list of training programs that have been completed by the user 122.

The digital training passport of the user 122 may also store, or be used to determine or acquire, one or more permissions of the user 122. These permissions may define what functions of the workbench system 100 the user 122 is allowed to access or utilise. These permissions may be used, e.g. by the controller 106, to enable, allow, disable, or limit selected functionality of the workbench system 100.

In this embodiment, the user profile comprises a log, i.e. a record, of tasks completed by the user 122 using the system 100, and dates and times on which those tasks were performed. This may be considered to be an "attendance record" for the user 122. This log may be limited to a pre-defined period of time, for example, the last year, or the last sixth months, etc.

In this embodiment, the user profile comprises user preferences for the user 122. User preferences may be specified for each of a plurality of different tasks. Examples of user preferences may include, but are not limited to, a preferred height for the benchtop 108, a preferred height for the display 114, a preferred handedness (e.g. left- or right-handed), a preferred lighting level for the system 100, preferred display options, and preferred audio options. The user preferences may be task dependent, i.e. there may be a respective set of user preferences (e.g. benchtop height, display height, etc.) for each of a plurality of different tasks that the user may perform using the system 100.

At step s8, the controller 106 determines a task to be performed by the user 122. In some embodiments, a sequence of tasks to be performed by the user 122 is determined.

In this embodiment, the controller 106 determines the task to be performed based on knowledge of a work order, which may specify one or more objects (i.e. products) that are to be produced. This knowledge of the work order may be stored locally on a memory of the controller 106, or may be received by the controller 106 from a remote location, for example, via a network, e.g. the Internet, or a LAN. The controller 106 compares the work order against the digital user profile of the user 122 acquired at step s6 to select one or more objects from the work order that the user 122 has the appropriate skills and competencies to produce. The controller 106 may also account for the type and number of components and consumables stored in the containers 112 thereby to ensure the correct type and quantity of components and consumables for the selected task(s) are available to the user 122. This information regarding the components and consumables may be stored locally on a memory of the controller 106, or may be received by the controller 106 from a remote location, for example, via a network, e.g. the Internet, or a LAN.

At step s10, based on the acquired user preferences and, optionally, the determined task, the controller 106 controls one or more of the workbenches 102. This control may be dependent on the determined task. More specifically, in this embodiment, the user preferences specify which workbench 102 is preferred by the user 122 for the performance of tasks (i.e. either the workbench 102 on the right-hand side of the robot 104 or the workbench 102 on the left-hand side of the robot 104). This preferred workbench 102 may be determined by the controller 106 from the handedness of the user 122 specified in the user preferences. The controller 106 controls the leg assemblies 110 of the preferred workbench 102 to adjust the height of the benchtop 108 of the preferred workbench 102. In this way, the benchtop 108 of the preferred workbench 102 is moved to a preferred height above the ground as specified in the user preferences. The controller 106 may control the frame 116 of the preferred workbench 102 to adjust the height of the display 114 of the preferred workbench 102. In this way, the display 114 of the preferred workbench 102 is moved to a preferred height above the ground (or above the benchtop 108) as specified in the user preferences.

In some embodiments, the controller 106 may control an output of the display 114 of the preferred workbench 102 based on the user preferences. For example, the brightness, contrast, volume, layout of information, format of text, size of text, etc. may be adjusted according to the user's preferences.

In some embodiments, other parameters of the system 100 or the workspace may be adjusted by the controller 106 based on the user preferences. Examples include, but are not limited to, a maximum movement speed for the robot 104, light levels within the working environment, a temperature within the working environment, and the playback of media content (e.g. music).

At step s12, the controller 106 displays, on the display 114 of the preferred workbench 102, instructions for performing the task determined at step s8. The instructions for the determined task may be stored locally on a memory of the controller 106, or may be acquired by the controller 106 from a remote location, for example, via a network, e.g. the Internet, or a LAN.

The instructions may be presented to the user 122 in any appropriate format, for example, images, text, video, and/or audio. The instructions may be presented to the user 122 as a sequence of instructions which the user is to follow in turn.

In some embodiments, the level of instruction provided to the user 122 at step s12 depends on the digital training passport of that user 122. For example, if the digital training passport of that user 122 indicates that the user 122 is to experienced at performing the determined task, they may be displayed a simplified set of instructions, while a less experienced user will be provided with more comprehensive instructions. In some embodiments, if the digital training passport of that user 122 indicates that the user 122 has not performed the determined task or a similar task within a predetermined time period, the user may be prevented from performing the determined task until the user 122 receives training (e.g. a refresher course). Such training may be provided to the user 122. In some embodiments, if the digital training passport of that user 122 indicates that the user 122 has not performed the determined task or a similar task within a predetermined time period, the workbench system 100 may specify that the user 122 require a certain level of oversight, inspection, or supervision when performing a task. Such supervision may be provided automatically by the workbench system 100, or the workbench system 100 may contact a human supervisor to attend to the user 122 performing the task.

In this embodiment, for the purposes of explanation, the determined task that is to be performed by the user 122 using the system 100 is an assembly process in which a plurality of components are to be fixed to a base structure, thereby to provide an assembled object (for example aircraft components such as an aircraft skin or frame). It will be apparent, however, to one skilled in the art that, in other embodiments, the determined task may comprise one or more different type of operations instead of or in addition to such an assembly process. Examples of such operations include, but are not limited to, fastening, riveting, repairing, assembling, disassembling, machining, drilling inspecting, gluing, electrical loom manufacture and painting operations.

At step s14, the controller 106 controls the robot 104 to hold, using the end effector 130, the base structure.

In some embodiments, the controller 106 controls the robot 104 to retrieve the base structure from a specified location, e.g. a location on a benchtop 108, or a compartment of a container 112. In some embodiments, the controller 106 detects, e.g. using images taken by a camera 126 or measurements taken by the sensors 120, a location of the base structure and controls the robot 104 to retrieve the base structure from the determined location. In some embodiments, the user 122 positions the base structure in a predetermined location, and the controller 106 controls the robot 104 to retrieve the base structure from that predetermined location. In some embodiments, the user 122 places the base structure into the end effector of the robot 104.

At step s16, the controller 106 determines a path for the robot 104 that will cause the robot 104 to move the base structure held by the end effector 130 from its current position to a predetermined position and orientation relative to the preferred workbench 102.

In other words, the controller 106 determines a movement operation for the robot 104, i.e. a movement operation that is to be performed by the robot and that, if performed, would cause the robot 104 to move from its current position to a predetermined position and orientation.

In some embodiments, the predetermined position and orientation is specified in a specification of the determined task, which may be acquired by the controller 106. The predetermined position and orientation for the base structure may be acquired by the controller 106 from a remote location, for example, via a network, e.g. the Internet, or a LAN. In some embodiments, the predetermined position and orientation for the base structure may be specified in the user preferences, e.g. the user 122 may specify the predetermined position and orientation.

At step s17, the controller 106 controls one or both of the optical projectors 124 to project an indication of the determined path for the robot 104 onto the system 100 and/or the nearby workspace.

The movement operation determined for the robot 104 (i.e. the movement operation determined at step s16) would, if performed, cause the robot 104 to move through or within a limited volume of space. This limited volume of space corresponds to or is associated with a limited area on the system 100 and/or the nearby workspace. For example, the limited volume of space may be entirely above the limited area (e.g. the limited area may be a vertical projection downwards of the limited volume of space onto the surfaces system 100 and/or the nearby workspace). The indication projected by the optical projector(s) 124 onto the system 100 and/or the nearby workspace may be indicative of the limited area, e.g. the projected indication may define a boundary of the limited area, or in some other way demarcate the limited area.

In some embodiments, the controller 106 determines the limited volume of space based on the determined movement operation, and then determines the limited area based on the determined limited volume of space. The optical projector(s) 124 may then be controlled based on the determined limited area. In some embodiments, the controller 106 determines the limited area based on the determined movement operation directly.

In this embodiment, one or both of the optical projectors 124 are controlled to project a visible light image (e.g. laser light) onto the upper surfaces of one or both benchtops 108 and/or the ground, thereby to indicate to the user 122 the space that the robot 104 will move through when the robot 104 follows the determined path. Thus, the user 122 is made aware of the space that the robot 104 will move through, and the user 122 moves outside of this space so as not to impede movement of the robot 104.

Advantageously, this tends to reduce the likelihood of injury to the user 122 caused by collision with the robot 104. A likelihood of damage to the robot 104 and the base structure caused by collision with the user 122 also tends to be reduced.

At step s18, the controller 106 controls the robot 104 to move the base structure from its current position, along the determined path, to the predetermined position and into the predetermined orientation.

Thus, the robot 104 is controlled to move through the space indicated to the user 122 by the optical projectors 124.

In some embodiments, the movement of the robot 104 along the determined path is performed responsive to a detection that the user 122 has moved outside of the space through which the robot 104 will be moved. Such a determination may be made by the controller 106 using camera images taken by the camera 126 and/or sensor measurements taken by the sensors 120 of the user 122.

At step s20, with the base structure held at the predetermined position and orientation, the controller 106 controls one or both of the optical projectors 124 to project an overlay image or indicator onto the base structure.

In this embodiment, a visible light (e.g. laser light) image or indicator is projected onto the surface of the base structure, thereby to indicate specific locations or features on the base structure to the user 122. The projected overlay image or indicator may provide instruction to the user 122, or may augment or reinforce instructions currently being displayed to the user 122 on the display 114.

By way of example, in some embodiments, an optical projector 124 may project an indication (e.g. an arrow) onto the surface of the base structure which indicates (e.g. points to) a particular feature on the base structure to which a component is to be fixed by the user 122. This may be accompanied by the display, on the display 144, of instructions to fix the component to the particular feature on the base structure. Other examples, of images, indicators, embellishments, animations, and the like which may be projected by the optical projectors 124 include, but are not limited to, circuit diagrams, wiring diagrams, safety notices, location of components, and component drawings.

The overlay image or indicator may be stored locally on a memory of the controller 106, or may be acquired by the controller 106 from a remote location, for example, via a network, e.g. the Internet, or a LAN.

In some embodiments, the controller 106 controls one or both of the optical projectors 124 to project the overlay image or indicator onto a different entity instead of or in addition to the base structure. For example, an indication, such as a circuit diagram, may be projected onto the upper surface of a benchtop 108. Thus, information useful for the user 122 may be projected to a location that is more easily viewable by the user 122 when the user 122 is working on the base structure/object. Also for example, an indication may be projected onto the container 112 so as to indicate to the user 122 a specific compartment (and thereby a specific type of component).

In some embodiments, the controller 106 may scale and/or warp the overlay image or indicator to match the real-world surface upon which it is projected. This advantageously tends to provide that the projected image or to indicator correctly overlays the real-world environment, and tends to compensate for the optical projector's projection angle, distance to the real-world objects, and three-dimensional curves on the projection surface in the real-world.

In some embodiments, the camera 126 may capture an image or images of one or more of the overlay images or indicators projected by the optical projector(s) 124. In other words, the camera 126 captures one or more images of the entities onto to which the overlay images have been projected. The controller 106 may use those captured images to perform an "instruction validation process" to determine whether the correct overlay image has been projected onto the correct entity and/or whether the projected overlay image is being displayed correctly (e.g. that the projection is in focus, has been scaled properly, has been warped correctly, etc.). The instruction validation process may comprise comparing the captured images of the projected overlays to images of an approved overlay appearance, and determining whether the projected overlay matches the approved overlay appearance. Images may be compared in any appropriate way. For example, in some embodiments two images are compared by comparing the characteristics of corresponding shapes within those images. A distance metric may be defined and calculated for the pair of images. If the value of the distance metric is within a predefined threshold, the two images may be considered to match. If the image of the projected overlay matches the image of the approved overlay appearance, the projected overlay may be deemed valid. However, if images of the projected overlay do not match those of the approved overlay, the assembled projected overlay may be deemed invalid. In the event that the projected overlay is deemed invalid, the projection of the overlay may be modified (e.g. re-focused, warped, scaled, etc.) to correct the appearance of the projected overlay.

At step s22, the user 122 performs the determined task on the base structure held by the robot 104. The user 122 may perform the task in accordance with the instructions displayed on the display(s) 114 and the overlay image projected onto the base structure.

In this embodiment, the task is an assembly process in which a plurality of components is to be fixed to a base structure. The instructions for performing to the task may be presented to the user 122 as a sequence of steps. Each step may, for example, specify a particular type of component from the container 112 and a specific location on the base structure to fix that component. The user may perform each of the steps in turn, as instructed, with subsequent steps displayed only when previous steps are completed. In this way the user 122 may perform the determined task, i.e. affixing the plurality of components to the base structure, thereby to provide the assembled object.

In this embodiment, for each step of the assembly process at which a component is to be attached to the base structure, the compartment of the container 112 in which that component is located is indicated to the user 122 by activating, by the controller 106, the respective indicator (e.g. an LED) of that compartment. Similarly, the location in the container 112 of consumables that are to be used by the user 122 may be indicated by activating appropriate indicators. Knowledge about which components or consumables are stored in which compartments of the container 112 may be stored locally on a memory of the controller 106, or may be received by the controller 106 from a remote location, for example, via a network, e.g. the Internet, or a LAN.

The controller 106 may maintain an inventory of the components and consumables stored in the containers 112, and may update this inventory when components or consumables are removed or returned by the user 122. The controller 106 may request resupply of components or consumables when stocks are low (e.g. when the number of a given component or consumable in a container 112 falls below a threshold). Such a request may be made to the user 122, or to an entity remote from the system. In some embodiments, the controller 106 automatically orders or requests a delivery of additional components from an entity (e.g. a component repository) that is remote from the system 100, for example in response to determining that a stock of a component or consumable is low. In response, the requested component or consumable may subsequently be delivered to the system 100. In some embodiments, the delivery of the requested component or consumable is performed by an autonomous vehicle or robot, hereafter referred to as a "delivery robot". Preferably, the controller 106 determines or acquires a path for the delivery robot proximate to the system 100. Preferably, the controller 106 controls one or both of the optical projectors 124 to project an indication of the determined path for the delivery robot 104 onto the system 100 and/or the nearby workspace. This indication may be an indication of a limited area through which the delivery robot may move. Thus, the user 122 is made aware of the space that the delivery robot will move through, and the user 122 may moves outside of this space so as not to impede movement of the delivery robot. Advantageously, this tends to reduce the likelihood of injury to the user 122 caused by collision with the delivery robot.

In some embodiments, the delivery robot moves along its path responsive to a detection that the user 122 has moved outside of the space through which the delivery robot will move. Such a determination may be made by the controller 106 using camera images taken by the camera 126 and/or sensor measurements taken by the sensors 120 of the user 122.

In some embodiments, during performance of the task, the camera 126 may capture images of the container 112, and the controller 106 may process these images to detect from which compartment of the container 122 the user has removed (or added) a component. If it is detected that the user 122 has removed an incorrect component for a given step of the task being performed, the controller 106 may alert the user 122 to this error, e.g. by displaying an alert or sounding an alarm. In some embodiments, the components removed from the container 112 by the user 122 are determined in a different way, for example by weighing container contents during the performance of the task. In some embodiments, images of the components are displayed on the display 114 so that the user 122 may verify that they have retrieved the correct component from the container 112.

In some embodiments, a LIDAR (Light Detection and Ranging) scanner is used instead of or in addition to the camera 126.

In this embodiment, during performance of the task, the controller 106 may control the robot 104 to move the base structure (which is held by the end effector 130) to facilitate the user 122 performing the task. For example, the base structure may be reoriented to allow for easier access by the user 122 to certain areas of base structure so that the user 122 may more easily fix components to that area. As described above in more detail earlier above with reference to step s17, prior to and/or during this movement of the assembled objected by the robot 104, an indication of the movement path of the robot 104 may be projected onto a surface by the optical projector(s) 124, thereby facilitating the user 122 avoiding collision with the moving robot 104.

At step s24, the controller 106 controls one or both of the cameras 126 to capture images of the assembled object. Step s24 may be performed responsive to the controller 106 determining that the task being completed by the user 122.

In this embodiment, images of multiple different views (i.e. orientations) of the assembled object are captured by the cameras 126. For example, in some embodiments, images of at least six different views of the assembled object are captured, which may include at least a top view, a bottom view, a front view, a rear view, a left-side view, and a right-side view.

In this embodiment, the controller 106 controls the robot 104 to move the assembled object (which is held by the end effector 130) so as to present the assembled object to the camera 126 at the multiple different orientations in turn, and controls the camera 120 to capture the images of those multiple different views of the assembled object in turn. As described in more detail earlier above with reference to step s17, prior to and/or during this movement of the assembled objected by the robot 104, an indication of the movement path of the robot 104 may be projected onto a surface by the optical projector(s) 124, thereby facilitating the user 122 avoiding collision with the moving robot 104. Thus, the user 122 is made aware of the space that the robot 104 will move through during the validation process, and the user 122 may move outside of this space so as not to impede movement of the robot 104 during validation. Advantageously, the tends decrease the likelihood of the user 122 inhibiting or detrimentally affecting the validation process, for example by knocking or bumping into the robot during validation. Thus, more accurate validation of assembled object tends to be provided. Furthermore, this tends to reduce the likelihood of injury to the user 122 caused by collision with the robot. In some embodiments, during validation, the robot only moves along its path responsive to a detection that the user 122 has moved outside the indicated space. Such a determination may be made by the controller 106 using camera images taken by the camera 126 and/or sensor measurements taken by the sensors 120 of the user 122.

At step s26, using the captured images of the assembled object, the controller 106 determines whether the assembled object is acceptable (i.e. within some predefined tolerance) by performing a validation process.

In this embodiment, the validation comprises comparing the captured images of the assembled object to images of an approved assembled object, and determining whether the assembled object produced by the user 122 matches the approved assembled object. In this embodiment, the image of each view of the assembled objected is compared to an image of the same view of the approved assembled object.

Images may be compared in any appropriate way. For example, in some embodiments two images are compared by comparing the characteristics of corresponding shapes within those images. A distance metric may be defined and calculated for the pair of images. If the value of the distance metric is within a predefined threshold, the two images may be considered to match. If the images of the assembled object match the images of the approved object for each of the different views, the assembled object may be deemed valid. However, if images of the assembled object do not match those of the approved object for one or more of the different views, the assembled object may be deemed invalid. The image comparison may be performed by comparing any appropriate image characteristics, including but not limited to shape, colour, and/or texture.

The images of the approved assembled object to which the captured images are compared may be stored locally on a memory of the controller 106, or may be acquired by the controller 106 from a remote location, for example, via a network, e.g. the Internet, or a LAN.

In some embodiments, one or more different validation processes may be performed to validate or otherwise the assembled object instead of or in addition to the image-based validation process. For example, in some embodiments, a workbench 102 further comprises a three-dimensional (3D) scanner which may be controlled by the controller 106. The 3D scanner is controlled to measure the shape of the assembled object. These measurements may be used to construct a 3D digital model of the assembled objects. The measurements may be compared to shape data of an approved object, and the assembled object may be approved or otherwise based on this comparison. Examples of appropriate 3D scanner include, but are not limited to, industrial computed tomography scanners and structured-light 3D scanners.

In some embodiments, the controller 106 is configured to determine physical properties of the assembled object using the end effector 130, e.g. based on measurements taken by one or more tactile sensors, vibration sensors, strain gauges, temperature sensors, and/or pressure sensors located on the end effector 130. Such determined physical properties may be used in the validation process, e.g. by comparing the measurements against corresponding data on an approved object or to a set of electronic design data or standards.

If, at step s26, the assembled object is validated (i.e. deemed acceptable), the method proceeds to step s28. However, if at step s26 the assembled object is determined to be not valid, the method proceeds to step s30, which will be described in more detail later below after a description of step s28.

At step s28, responsive to the assembled being determined to be valid, the assembled object is released by the end effector 130 of the robot 104, and the assembled object is removed from the system 100. The assembled object may then be used for its intended purpose. After step s28, the process of FIG. 3 ends. The system 100 may then be used to assist the user 122 in assembling additional objects or performing other tasks.

At step s30, responsive to the assembled object being determined to be unacceptable (i.e. not valid), the controller 106 controls the system 100 to provide assistance and/or training to the user 122. An alert may be provided, e.g. on the display or smartwatch.

In this embodiment, assistance and/or training are provided in the form of images, text, and/or video displayed by the controller 106 on one or both of the displays 114. Such images, text, and/or video may instruct the user 122 how to rectify faults with the assembled object, or how to correctly assemble the object. The information presented to the user 122 on the display(s) 114 depends on the task being performed and the object being assembled. In some embodiments, the format of the information presented to the user 122 on the display(s) 114 depends on the acquired user preferences. In some embodiments, the information presented to the user 122 on the display(s) 114 depends on the acquired digital training passport of the user, i.e. the skills and competencies information for the user 122.

In some embodiments, one or more reasons why the assembled object was deemed to be invalid are determined by the controller 106 based on the performed validation process. For example, one or more specific faults with the assembled object may be identified. The assistance and/or training information presented to the user 122 on the display(s) 114 may depend on the one or more reasons determined.

In some embodiments, assistance and/or training is provided in a different form instead of in addition to the (e.g. pre-recorded) instructional images, text, and/or video displayed by the controller 106 on one or both of the displays 114. For example, in some embodiments, the controller 106 may control one or both of the optical projectors 124 to project an image or indication onto, for example, a benchtop 108 or the assembled object. Such projections may, for example, indicate to the user 122 an identified faulty part of the assembled object or a position at which a component should be fixed but is not.

Also for example, in some embodiments, the controller 106 contacts a further human user, and requests that other user assist the user 122. Preferably, the further user is an engineer or technician experienced in the assembly task being performed, i.e. an expert. For example, the controller 106 may establish a teleconference or other communications link between the workbench 102 and a communications device of the further user. Such a teleconference may allow for the live exchange of information between the user 122 and the further user. The teleconference may include using the display(s) 114 and/or audio system of the workbench 102 to present information to the user 122. In some embodiments, the controller 106 sends a request to the further user (e.g. to a communications device of that further user) that the further user attend the system 100 to aid the user 122. The further user may then approach the system 100 and aid the user 122. This may include the further user logging in to the system (e.g. in the same way that the user 122 logged in to the system 100) and/or demonstrating a correct procedure using the other workbench 102 to that being used by the user 122 or for overriding/recovering errors in the system.

At step s32, using the provided assistance and/or training, the user 122 modifies the assembled object or prepares a new assembled object to undergo the validation process. In some embodiments, the assembled object that was deemed to be invalid may be scrapped or recycled.

After step s32, the process of FIG. 2 returns to step s24 whereat images of the modified/new assembled object are captured and used to validate or otherwise the modified/new assembled object. The process of performing the task, validation, and assistance may be an iterative process.

Thus, a method of performing a task using the workbench system 100 is provided.

An advantage provided by the above described system and method is that improved quality in the objects produced by the user, and fewer rejections tend to be realised. Additionally, the system tends to enable greater flexibility of the workforce for adapting to new tasks or manufacturing updates or revisions. The system and method of the present invention is particularly useful in the aerospace industry and for producing aircraft parts such as skins and frames.

The above described system and method tends to provide for fully automated validation and verification of the produced objects.

The above described system may be used to provide training to users (e.g. multiple users simultaneously). This training may be automatically recorded in the digital training passports of the users.

Advantageously, the above described control of the physical characteristics of the system (such as workbench height, display height, display format etc.) tends to facilitate use by different users having various different physical characteristics. For example, use by physically disabled or impaired users tends to be facilitated.

The above described system may record, e.g. using the cameras, images or video of the user performing the task. Such recordings may be used for traceability and/or training purposes.

Advantageously, the robot tends to provide a readily adjustable fixture for different objects. Thus, a reliance on expensive fixturing for different applications tends to be reduced. Also, the workbench system may be used for a wider range of applications. Also, development required for each new application tends to be reduced.

Advantageously, the robot may be fully integrated within the system architecture, such that the robot is communicatively coupled to other devices within the system. Thus, the robot may be controlled dependent on inputs from other devices within the system.

Advantageously, the smartwatch may be implemented to measure parameters of the user's working environment, such as vibration levels, noise levels, temperatures, gas/chemical exposure levels, dust levels. The smartwatch may also be implemented to measure physical properties of the user, e.g. heartrate, blood pressure, etc. Such measurements may be used to improve the safety of the user. For example, based on the measurements, an alert may be displayed by the smartwatch to the user, e.g. if vibration limits are exceeded. Also, based on the measurements, certain functionality of the workbench (e.g. vibration heavy operations) may be prevented or disabled. Also, such measurements may be used to schedule tasks to be performed by the user. For example, vibration heavy actions may be rescheduled to reduce the likelihood of injury to the user. In some embodiments, the parameters of the user's working environment and/or the physical properties of the user are measured by a different entity, e.g. one or more sensors located on the workbench.

Smartwatches tend to be rugged and lightweight. Also, users tend to be accustomed to wearing such devices. Conventional smartwatches tend to be easily adapted to provide the functionality described herein.

In the above embodiments, the assisted workbench system comprises two workbenches. However, in other embodiments, the assisted workbench system comprises a different number of workbenches, for example only a single workbench.

In the above embodiments, the assisted workbench system comprises a single robot. However, in other embodiments, the assisted workbench system comprises a different number of robots, for example more than one robot.

In the above embodiments, a workbench comprises a display. However, in other embodiments, the display may be omitted. For example, in such embodiments, information (e.g. instructions, alerts, etc.) may be displayed on the user's smartwatch.

In the above embodiments, the robot is a six-axis robot arm. However, in other embodiments the robot is a different type of robot. For example, the robot may have a different number of rotary axes about which it may be controlled to move. Also, in some embodiments, the robot may include one or more linear axes along which the robot may be moved. For example, the robot may be mounted to a rail or track along which it may be slid. Alternatively, the robot may be mounted on a vehicle (e.g. an autonomous, semi-autonomous, or human-operated vehicle) which can be controlled to move to a desired position around the workbench.

In the above embodiments, the end effector comprises a gripper. However, in other embodiments, the robot may comprise a different type of end effector instead of or in addition to the gripper. Examples of appropriate end effectors include, but are not limited to, additive manufacturing (AM) apparatus, drills, cutting tools, riveting apparatus, sealant deposition apparatus, part marking apparatus, and laser etching apparatus.

In the above embodiments, the camera is a visible light camera. However, in other embodiments, one or more other types of imaging device may be implemented instead of or in addition to the visible light camera, for example an infrared camera, an ultraviolet camera, or a full-spectrum camera.

In the above embodiments, inspection and validation of an object is performed at the end of the assembly process. However, in other embodiments, inspection and validation of an object is performed at one or more intermediate stages during object production. In some embodiments, inspection and validation of an object is performed at one or more discrete points during production, while in other embodiments inspection and validation of an object is performed continuously throughout its production.

In the above embodiments, the initiation of training and/or assistance provision is automatic, e.g. in response to a determination that the assembled object is invalid. However, in other embodiments, training and/or assistance may be requested by the user manually, e.g. by tapping a "help" icon on the display or on the smartwatch.

In the above embodiments, the user wears a smartwatch. However, in other embodiments, the smartwatch may be omitted. For example, a different type of mobile device that may be carried by the user may be used. Preferably, the mobile device is a body worn mobile device, such as smart-glasses.

In the above embodiments, the controller may acquire various information and data from a remote location, for example, via a network, e.g. the Internet, or a LAN. For example, in some embodiments, the assisted workbench system (and optionally multiple other workbench systems) are connected to a common Enterprise System (ES), for example via a broker module. The ES may include software packages that support business processes, information flows, reporting, and/or data analytics throughout the network of workbench systems. The ES may comprise resource and scheduling information and information relating to work orders, information relating to possible tasks, and instructions relating to those tasks. The ES may comprise video, images, audio files, CAD drawings, and the like. In such embodiments, preferably intermediate software (e.g. middleware) is coupled between the operating system of the workbench controller and the ES. This intermediate software may be comprised with a workbench system (e.g. within the controller). This intermediate software may act as a bridge between an operating system of the workbench and the ES. This intermediate software may allow the workbench to operate with the ES without the workbench and the ES being physically integrated. This tends to provide that the workbenches are "plug and play" apparatuses that may be connected to, and work with, different Enterprise Systems.

What is claimed is:

1. A method for a workbench system, the workbench system comprising a workbench, a multi-axis robot comprising an end effector for holding an object, a visible light projector, a camera, a container comprising a plurality of compartments, and a controller, the workbench and the robot being located in a common workspace, the method comprising:
   determining, by the controller, a movement operation for the robot, the movement operation being such that the robot presents multiple different views of the object held by the end effector to the camera;
   using the determined movement operation, controlling the visible light projector to project a visible light indication onto at least one of a surface of the workbench and a surface of the workspace;
   controlling, by the controller, the visible light projector to project a visible light indicator onto the container, thereby to indicate a specific one of the plurality of compartments;
   controlling, by the controller, the robot to perform the movement operation;
   controlling, by the controller, the camera to capture images of the multiple different views of the object held by the end effector; and
   performing, by the controller, a validation process using the images captured by the camera,
   wherein the visible light indication indicates a limited area of the workbench and/or workspace, the limited area corresponding to a limited volume of space, and
   wherein the movement operation is such that, if the robot performs the movement operation, the robot moves entirely within only the limited volume of space.

2. A method for a workbench system, the workbench system comprising a workbench, a multi-axis robot comprising an end effector for holding an object, a visible light projector, a camera, and a controller, the workbench and the robot being located in a common workspace, the method comprising:
 determining, by the controller, a task to be performed by a user using the workbench system;
 determining, by the controller, a movement operation for the robot based on the determined task;
 using the determined movement operation, controlling the visible light projector to project a visible light indication onto at least one of a surface of the workbench and a surface of the workspace;
 controlling, by the controller, the robot to perform the movement operation;
 controlling, by the controller, the camera to capture images of multiple different views of the object held by the end effector; and
 performing, by the controller, a validation process using the images captured by the camera,
 wherein the visible light indication indicates a limited area of the workbench and/or workspace, the limited area corresponding to a limited volume of space, and
 wherein the movement operation is such that, if the robot performs the movement operation, the robot moves entirely within only the limited volume of space.

3. A workbench system comprising:
 a workbench;
 a multi-axis robot comprising an end effector for holding an object;
 a visible light projector;
 a camera;
 a container, the container comprising a plurality of compartments; and
 a controller, wherein
 the workbench and the robot are located in a common workspace, and
 the controller is configured to:
 determine a movement operation for the robot; and
 using the determined movement operation, control the visible light projector to project a visible light indication onto at least one of a surface of the workbench and a surface of the workspace, wherein
 the visible light indication indicates a limited area of the workbench and/or workspace, the limited area corresponding to a limited volume of space,
 the movement operation is such that, if the robot performs the movement operation, the robot moves entirely within only the limited volume of space, and
 the controller is further configured to:
 control the visible light projector to project a visible light indicator onto the container, thereby to indicate a specific one of the plurality of compartments,
 control the robot such that the robot presents multiple different views of the object held by the end effector to the camera;
 control the camera to capture images of multiple different views of the object held by the end effector; and
 perform a validation process using the images captured by the camera.

4. The workbench system of claim 3, wherein the limited volume of space is entirely above the limited area of the workbench and/or workspace.

5. The workbench system of claim 3, further comprising:
 one or more sensors configured to detect a presence of a user within the limited volume of space,
 wherein the controller is configured to control the robot to perform the movement operation responsive to determining, using measurements of the one or more sensors, that the user is not within the space.

6. The workbench system of claim 3, wherein the controller is further configured to:
 determine a task to be performed by a user using the workbench system; and
 control the robot based on the determined task.

7. The workbench system of claim 6 wherein the controller is further configured to:
 determine a task to be performed by a user using the workbench system;
 control the robot based on the determined task; and
 control the visible light projector to project the visible light indicator onto the object, the visible light indicator based on the determined task.

8. The workbench system of claim 7, wherein the controller is further configured to control the visible light projector to project a further visible light indicator onto a surface of the workbench, the further visible light indicator based on the determined task.

9. The workbench system of claim 8, further comprising:
 a sensor system comprising one or more sensors, the sensor system configured to identify a user in the workspace, wherein
 the controller is further configured to determine the task based on the identity of the user.

10. The workbench system of claim 9, wherein the one or more sensors are configured to acquire a user identifier for identifying the user from a mobile device carried by the user, wherein the mobile device is a mobile device selected from the group of mobile devices consisting of a body-worn mobile device and a radio-frequency identification tag.

11. The workbench system of claim 10, further comprising:
 a display, wherein
 the controller is further configured to control the display based on the determined task.

12. The workbench system of claim 3, wherein the camera is a visible light detecting camera.

13. The workbench system of claim 3, wherein the visible light projector comprises a laser projector.

* * * * *